Figure 1:
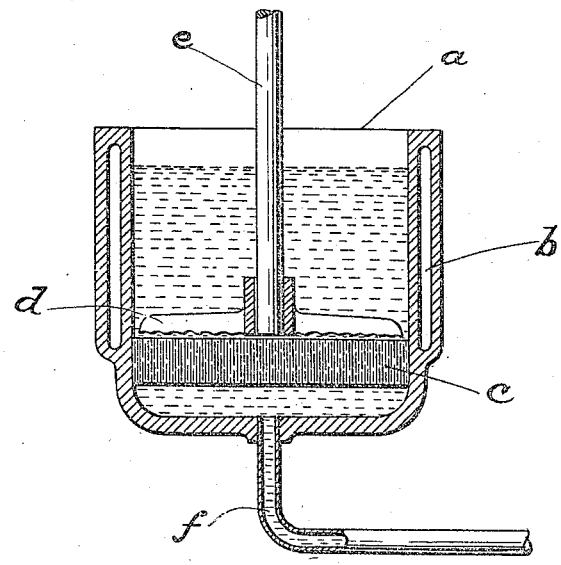

No. 879,899. PATENTED FEB. 25, 1908.
F. I. DU PONT.
PROCESS OF OBTAINING DINITROGLYCERIN, &c.
APPLICATION FILED SEPT. 11, 1907.

2 SHEETS—SHEET 1.

WITNESSES:

INVENTOR
Francis I. du Pont
BY
Harding & Harding
ATTORNEYS.

No. 879,899. PATENTED FEB. 25, 1908.
F. I. DU PONT.
PROCESS OF OBTAINING DINITROGLYCERIN, &c.
APPLICATION FILED SEPT. 11, 1907.

2 SHEETS—SHEET 2.

WITNESSES:
Rob't R. Kitchel
M. M. Hamilton

INVENTOR
Francis I. du Pont
BY
Harding & Harding
ATTORNEYS.

UNITED STATES PATENT OFFICE.

FRANCIS I. DU PONT, OF WILMINGTON, DELAWARE, ASSIGNOR TO THE E. I. DU PONT DE NEMOURS POWDER COMPANY, OF WILMINGTON, DELAWARE, A CORPORATION OF NEW JERSEY.

PROCESS OF OBTAINING DINITROGLYCERIN, &c.

No. 879,899.     Specification of Letters Patent.     Patented Feb. 25, 1908.

Application filed September 11, 1907. Serial No. 392,257.

*To all whom it may concern:*

Be it known that I, FRANCIS I. DU PONT, a citizen of the United States, residing at Wilmington, county of Newcastle, and State of Delaware, have invented a new and useful Improvement in Processes of Obtaining Dinitroglycerin, &c., of which the following is a full, clear, and exact description, reference being had to the accompanying drawings, which form a part of this specification.

My invention relates to that class of nitrations where nitric acid alone is used, as, for example, the manufacture of dinitroglycerin.

It has for its object to neutralize the excess nitric acid with ammonia and thus produce, as a by-product, nitrate of ammonia which itself is a valuable product, and the recovery of the dinitro-glycerin and by-product.

In the manufacture of di-nitro-glycerin, nitric acid alone is used to produce the nitration. When the nitration has proceeded to the extent of forming dinitro-glycerin, ordinarily calcium carbonate or some similar substance is used to neutralize the excess nitric acid. This can be readily used, as the action is without the production of heat or affecting the dinitroglycerin formed. On the other hand, with this neutralizer calcium nitrate is obtained as a by-product, which is a valueless product. In like manner with the other neutralizing substances used, a relatively valueless product is also produced.

Nitrate of ammonia is a valuable product. If ammonia be used, in the same manner as calcium carbonate, to neutralize the excess of nitric acid, difficulties arise. Ammonia being a strong base, and nitric acid a strong acid, the reaction is violent, causing heat and, with di-nitro-glycerin, the consequent decomposition of the dinitro-glycerin. In my process when I introduce the ammonia, I at the same time, maintain or cause the maintenance of the mixture at a temperature at which the dinitroglycerin will not decompose.

When ammonium hydroxid is used, it is generally necessary or desirable that considerable water should be added with this ammonia hydroxid. This added water prevents the proper separation of the dinitroglycerin from the solution. I remove this water to an extent which will allow the separation of the dinitroglycerin in the following manner, and the recovery of dinitroglycerin and the by-product, nitrate of ammonia: I subject the mixture after neutralization to the action of heat and a vacuum. Dinitroglycerin is quite sensitive to heat, but by the use of a vacuum, the evaporating point of the water is so lowered that the heat necessary to be used is insufficient to affect the dinitroglycerin. The extent of the vacuum which I use will depend upon the extent to which the neutralization has been made perfect. The reason for this is that if the neutralization be not complete, the dinitroglycerin in the presence of the remaining acid is far more sensitive to heat than it would be were the neutralization complete and thus such acid not present. The vacuum will also vary or be dependent upon the amount or quantity of the ammonium salt produced in the neutralization.

In my practice of producing dinitroglycerin I exercise great care to produce complete neutralization and under such circumstances I have found that a vacuum corresponding to a reduction of 28.229 in. of mercury *i. e.*, a pressure corresponding to less than 2 in. of mercury will give good results.

Figure 2:
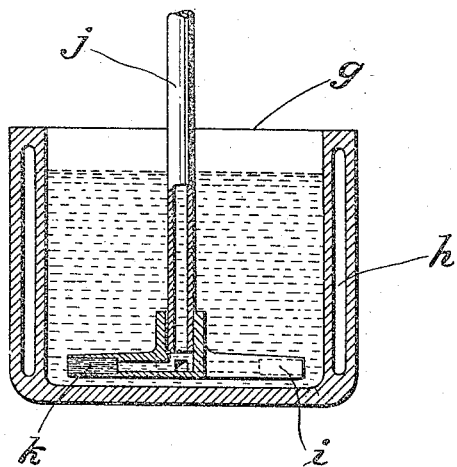
Figure 3:
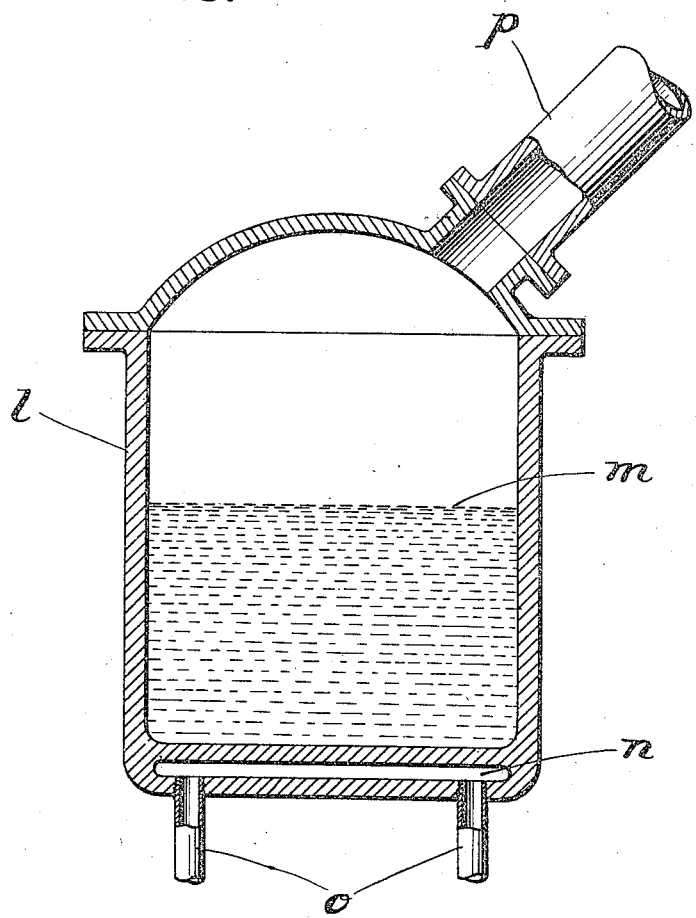

In the drawings: Figure 1 represents in section one form of apparatus for carrying out the neutralization step. Fig. 2 represents in section another form of apparatus for carrying out the naturalization step. Fig. 3 represents in section a vessel for removing the water.

Speaking first of Fig. 1: $a$ is a vessel having a water jacket $b$ through which water may be passed in the ordinary and well known manner. Into this vessel are introduced with the usual precautions the glycerin and nitric acid. Above the bottom of this vessel is a filtering stone $c$ or other filtering material.

$d$ is the stirrer connected to the shaft $e$ revolved in the ordinary manner by means not shown.

$f$ is a pipe which enters vessel $a$ below the filtering material. When the nitration has proceeded to the proper extent to form di-nitroglycerin, ammonia water is introduced, under pressure, through the pipe $f$, the rate of neutralization depending upon the pressure. The ammonia water oozes through the filtering material and neutralizes the excess acid in the mixture in the vessel $a$. The water in the water jacket $b$ maintains a temperature at which the dinitroglycerin will not be decomposed. As a result, there is produced dinitroglycerin in the presence of some water and nitrate of ammonia in solution. The solution of nitrate of ammonia is then concentrated and dried. There is thus produced a valuable product, nitrate of ammonia, made from the unavoidable excess of nitric acid which it is necessary to employ in the manufacture of the main product.

I do not intend to limit myself to the use of my invention in the manufacture of dinitroglycerin, as it can be used with any similar nitration where nitric acid, without sulfuric acid, is used. Further, as shown in Fig. 2, where $g$ is the vessel and $h$ the water jacket, I can eliminate the filtering material in the bottom, and the pipe $f$ as shown in Fig. 1, and form the stirrer $i$ and stirrer shaft $j$ hollow. The stirrer $i$ at its ends having outlets and having filtering material $k$ in the hollow portion of said stirrer. In this case, the ammonia water is introduced through the hollow shaft $j$ and passes into the mass through the ends of the hollow stirrer $i$. After the excess acid has been neutralized by ammonia as just described, the mixture of dinitroglycerin, water and nitrate of ammonia is run into a vessel, provided with a jacket for warm water circulation. In Fig. 3 is shown in section such a vessel. In this drawing, $l$ is the vessel, $m$ the material in the vessel, $n$ the jacket having the pipes $o$ leading to and from said jacket, for the circulation of warm water. At the upper portion of the vessel is the pipe leading to a vacuum pump. Heat is applied by causing warm water to pass through pipes $o$ and jacket $n$. Vacuum is also applied to pipe $p$ to lower pressure within the vessel to a point at which heat, at a temperature below that which affects the dinitroglycerin, will cause the mixture to boil and the water to the desired extent to pass off through the pipe $p$. After this operation, there is left in the vessel dinitroglycerin and a concentrated solution of ammonium nitrate. When I use the term "vacuum", I intend to include a partial vacuum.

This operation is carried on until a greater proportion of the water is removed. In this condition, due to the different specific gravities of the material, there will be formed layers, in one layer of which is the dinitroglycerin and in the other the ammonium nitrate, and these two layers may be readily separated, as is now done.

Having now fully described my invention, what I claim and desire to protect by Letters Patent is:

1. In the process of nitrating an organic compound with nitric acid alone, the hereinbefore described step of neutralizing the excess of nitric acid for the purpose of producing a valuable by-product, which consists in neutralizing said excess acid with ammonia.

2. In the process of nitrating an organic compound with nitric acid alone, the hereinbefore described step of neutralizing the excess nitric acid for the purpose of producing a valuable by-product, which consists in neutralizing said excess acid with ammonia admitted in a comminuted form.

3. In the process of nitrating an organic compound with nitric acid alone, the hereinbefore described step of neutralizing the excess of nitric acid for the purpose of producing a valuable by-product, which consists in neutralizing said excess acid with ammonia, and maintaining the mass, during said neutralization, at a temperature at which the nitrated material will not decompose.

4. The hereinbefore described process, which consists in nitrating glycerin to dinitroglycerin by nitric acid alone, neutralizing the excess nitric acid by means of ammonia hydroxid and water, and then subjecting the mixture to the action of heat, and a vacuum sufficient to maintain the temperature of the evaporating point of the water below that affecting the dinitroglycerin.

In testimony of which invention, I have hereunto set my hand, at Wilmington, Del., on this 30th day of August, 1907.

FRANCIS I. DU PONT.

Witnesses:
IRVING EYER,
JAMES J. COOK.